United States Patent
Manfredi et al.

(10) Patent No.: US 6,911,522 B2
(45) Date of Patent: Jun. 28, 2005

(54) FILLED EPSILON-CAPROLACTONE BASED POLYMER COMPOSITIONS, METHOD FOR PREPARING SAME AND ARTICLES BASED ON SAID COMPOSITIONS

(75) Inventors: Dino Manfredi, Zwijnaarde (BE); Ivan Claeys, Boortmeerbeek (BE)

(73) Assignee: SOLVAY (Societe Anonyme), Brussels (BE)

( * ) Notice: Subject to any disclaimer, the term of this patent is extended or adjusted under 35 U.S.C. 154(b) by 11 days.

(21) Appl. No.: 10/169,758

(22) PCT Filed: Jan. 19, 2001

(86) PCT No.: PCT/EP01/00578

§ 371 (c)(1),
(2), (4) Date: Nov. 7, 2002

(87) PCT Pub. No.: WO01/53401

PCT Pub. Date: Jul. 26, 2001

(65) Prior Publication Data

US 2003/0129401 A1 Jul. 10, 2003

(30) Foreign Application Priority Data

Jan. 20, 2000 (EP) ............................................. 00200231

(51) Int. Cl.⁷ .................. C08G 63/08; B32B 21/02; C08K 3/26; B29C 49/04
(52) U.S. Cl. .................. 528/354; 528/355; 528/357; 528/358; 528/359; 524/425; 525/408; 525/411; 525/413; 521/50; 428/402; 428/34.1; 428/220; 428/36.92; 428/304.4; 428/480; 264/176.1; 264/211.24; 264/500; 264/555; 264/563
(58) Field of Search .................. 528/354–355, 528/358–359; 524/425; 525/411, 413, 408, 425; 521/50; 428/402, 34.1, 36.92, 480, 220, 304.4, 495; 264/176.1, 211.24, 500, 555, 563

(56) References Cited

U.S. PATENT DOCUMENTS

| | | | | | |
|---|---|---|---|---|---|
| 3,852,913 A | * | 12/1974 | Clendinning et al. | ........... | 47/74 |
| 3,919,163 A | * | 11/1975 | Clendinning et al. | ........... | 47/74 |
| 5,882,787 A | * | 3/1999 | Claeys et al. | ............... | 428/338 |
| 6,180,053 B1 | * | 1/2001 | Claeys et al. | ............... | 264/564 |
| 6,255,445 B1 | * | 7/2001 | Dutton et al. | ............... | 528/354 |
| 6,355,699 B1 | * | 3/2002 | Vyakarnam et al. | ........... | 521/61 |

FOREIGN PATENT DOCUMENTS

| | | |
|---|---|---|
| EP | 0 654 504 | 5/1995 |
| FR | 2 721 037 | 12/1995 |
| FR | 2 746 406 | 9/1997 |
| JP | 5 070696 | 3/1993 |

* cited by examiner

Primary Examiner—P. Hampton Hightower
(74) Attorney, Agent, or Firm—Oblon, Spivak, McClelland, Maier & Neustadt, P.C.

(57) ABSTRACT

Compositions based on ε-caprolactone polymer, comprising at least one ε-caprolactone polymer and calcium carbonate. Process for preparing these compositions, which are used for manufacturing articles, in particular films, preferably obtained by extrusion blow-moulding or by flat-die extrusion.

25 Claims, No Drawings

FILLED EPSILON-CAPROLACTONE BASED POLYMER COMPOSITIONS, METHOD FOR PREPARING SAME AND ARTICLES BASED ON SAID COMPOSITIONS

The invention relates to compositions based on ε-caprolactone polymer containing calcium carbonate, to a process for preparing them and to articles (films, foams, bottles, plaques and sheets) based on these compositions.

ε-caprolactone polymers have good biodegradability, which makes them attractive for various applications in which this property is required.

Among the applications that may be mentioned are films used for making bin bags, films for agriculture, wrapping films, shrouds or nappies; foams, bottles and thermoformed products including, for example, pots for young plants. These polymers may also be used in the form of plaques.

To reduce the cost price of articles produced from these polymers, mineral fillers are commonly used.

The use of such fillers in ε-caprolactone polymer compositions poses various problems, in particular for their uses in the form of films. Thus, it is known that the presence of such fillers in compositions based on these polymers usually causes, after using these compositions, especially in the form of films, a deterioration in the mechanical properties, especially their impact strength. This drawback is particularly inconvenient when the compositions are used in the form of films, especially for use as bin bags.

Another drawback of mineral fillers is that they generally cannot be used at high concentration in compositions based on ε-caprolactone polymer, because of the risk of deterioration in the aspect of the films produced (especially on account of the presence of hard points and a coarse feel, due to poor dispersion and to the presence of aggregates).

The Applicant has now discovered that, contrary to the generally accepted ideas, it is possible to obtain compositions based on ε-caprolactone polymer containing calcium carbonate as filler, which not only do not have these drawbacks, but also can lead to an improvement in the mechanical properties of manufactured articles based on these compositions.

Specifically, it has been observed, surprisingly, that articles with undeteriorated, or even improved, mechanical properties can be obtained by using calcium carbonate particles in ε-caprolactone polymer compositions, even in high concentration.

A subject of the invention is, firstly, compositions based on ε-caprolactone polymer, comprising at least one ε-caprolactone polymer and calcium carbonate.

The compositions according to the invention comprise more than 25% by weight of calcium carbonate. Preferably, the compositions according to the invention comprise at least 30% by weight of calcium carbonate.

Usually, the compositions according to the invention comprise up to 80% by weight of calcium carbonate and preferably up to 50% by weight of calcium carbonate.

The expression "ε-caprolactone polymers" is intended to denote not only ε-caprolactone homopolymers but also copolymers with a predominant content of ε-caprolactone, for example at least 50% by weight, with other monomers, preferably with other cyclic lactones. Among these cyclic lactones that may be mentioned, for example, are β-propiolactone, γ-butyrolactone, δ-valerolactone, 1,4-dioxan-2-one, 1,4-dioxepan-2-one, 1,5-dioxepan-2-one, glycolide (1,4-dioxane-2,5-dione) and substituted derivatives thereof, and also L-lactide, D-lactide and D,L-lactide. The ε-caprolactone polymers are preferably ε-caprolactone homopolymers.

The ε-caprolactone polymers used in the compositions according to the invention may be unbranched ε-caprolactone polymers or branched ε-caprolactone polymers, i.e. polymers containing a non-zero degree of branching.

The branched ε-caprolactone polymers preferably have a gel content (content of chloroform-insoluble polymers extracted using a soxhlet after 8 hours) of less than or equal to 0.5% and particularly preferably equal to zero. They may have been obtained by a melt reaction in an extruder in the presence of a free-radical generator. In this case, the free-radical generator is usually used in an amount that is sufficient to obtain a non-zero degree of branching of the ε-caprolactone polymers while avoiding the formation of a gel. An example of a free-radical generator that may be used is 2,5-dimethyl-2,5-di-t-butylperoxyhexane (DHBP).

Advantageously, the calcium carbonate has very good dispersibility in the ε-caprolactone polymers, and has no tendency to form aggregates in these polymers.

It is important to point out that the characteristics of the calcium carbonate used in the compositions according to the invention, which are given below, are characteristics measured or described for the calcium carbonate before it is incorporated into the compositions according to the invention.

The calcium carbonate in the compositions according to the invention is usually in the form of particles, which preferably have one or more of the particle size characteristics mentioned below. Particle size curves showing the existence of relatively small particles and a narrow particle size distribution have been obtained for calcium carbonate of compositions according to the invention.

The mean diameter of the calcium carbonate particles is less than 5 μm. It is preferably less than 3 μm. In a particularly preferred manner, it is less than or equal to 1.5 μm. In a most particularly preferred manner, it is less than 1 μm.

In the case of narrow particle size distributions, the median particle diameter has a value very close to that of the mean diameter.

For the purposes of the present invention, the expression "mean diameter" is intended to denote the mean diameter measured by light scattering using a Coulter LS 230 laser granulometer using the PIDS (Polarization Intensity Differential Scattering) measuring system.

The fraction of the calcium carbonate particles with a diameter of greater than 25 μm is usually less than 0.04% by volume, and preferably zero.

The fraction of the calcium carbonate particles with a diameter of greater than 10 μm is less than 3% by volume, preferably less than 1% by volume and particularly preferably less than or equal to 0.5% by volume.

The fraction of calcium carbonate particles with a diameter of less than 0.1 μm is generally greater than 2% by volume.

The high cutoff (i.e. the particle diameter value which is such that at least 99% by weight of the particles have a diameter less than this value) is advantageously less than 12 μm and particularly preferably less than 10 μm. In a most particularly preferred manner, it is less than 8 μm.

The calcium carbonate in the compositions according to the invention may be of synthetic origin or of natural origin.

When it is of synthetic origin, the calcium carbonate is usually obtained by the carbonatation of a milk of lime or by the reaction between sodium carbonate and calcium hydroxide.

Preferably, the calcium carbonate in the compositions according to the invention is of natural origin and is obtained from ground marble. Among the examples of such calcium carbonates is the FILMLINK® 400 calcium carbonate sold by ECC International.

The calcium carbonate advantageously contains less than 0.5% moisture and preferably contains less than 0.3% moisture.

The calcium carbonate in the compositions according to the invention is usually in the form of coated particles. The coating on the calcium carbonate particles represents less than 3% by weight, preferably less than 2% by weight and particularly preferably less than 1.5% by weight of the calcium carbonate particles.

The coating comprises one or more fatty acids chosen from saturated and unsaturated fatty acids with a chain of 8 to 26 carbon atoms. Good results have been obtained with saturated fatty acids.

Among the saturated fatty acids that may be mentioned, for example, are caprylic ($C_8$) acid, capric ($C_{10}$) acid, lauric ($C_{12}$) acid, myristic ($C_{14}$) acid, palmitic ($C_{16}$) acid, stearic ($C_{18}$) acid, arachidic ($C_{20}$) acid, behenic ($C_{22}$) acid and lignoceric ($C_{24}$) acid.

Among the unsaturated fatty acids that may be mentioned, for example, are lauroleic ($C_{12}$) acid, myristoleic ($C_{14}$) acid, palmitoleic ($C_{16}$) acid, oleic ($C_{18}$) acid, ricinoleic ($C_{18}$) acid, linoleic ($C_{18}$) acid and linolenic ($C_{18}$) acid.

When calcium carbonate is treated with an agent comprising one or more fatty acids to obtain a coating on the particles, some of these fatty acids bind chemically to the calcium carbonate. In the context of the present invention, these will then be referred to as fatty acids bound to the particles or chemisorbed.

Another portion of these fatty acids, either which has not reacted, or which has, where appropriate, reacted with $Ca^{++}$ ions present in the calcium carbonate, does not bind chemically to the said calcium carbonate particles. In the context of the present invention, these fatty acids will be referred to in this case as free fatty acids, not bound to the particles or physisorbed.

The calcium carbonate in the compositions according to the invention comprises fatty acids bound to the calcium carbonate particles and fatty acids not bound to the calcium carbonate particles.

In the compositions according to the invention, the proportion of fatty acids not bound to the calcium carbonate particles is less than 0.5% by weight relative to the weight of the calcium carbonate. It is preferably less than 0.1% and particularly preferably less than 0.05% by weight relative to the weight of the calcium carbonate. In a more particularly preferred manner, the proportion of fatty acids not bound to the calcium carbonate is less than 0.02% by weight relative to the weight of the calcium carbonate. This concentration is measured by extraction with diethyl ether, according to the process described in the examples of the present patent application (chemical analyses of FILMLINK® 400 calcium carbonate).

Preferably, the calcium carbonate in the compositions according to the invention contains less than 2.5% by weight of impurities. These impurities may comprise carbonates, metal oxides and/or silicas. When it is a coated calcium carbonate, the impurities of the coating may comprise, for example, fatty acids other than those mentioned above, fatty alcohols and aliphatic esters.

Among the calcium carbonates that may be used for the compositions according to the invention, mention may be made, for example, of those described in international patent application WO 99/28050.

The calcium carbonate used is preferably the product sold by ECC International under the brand name FILMLINK®, in particular under the name FILMLINK® 400 Powder.

The technical sheet produced by the company ECC International, dated June 1998 is incorporated by reference. This sheet comprises two pages respectively entitled "FILMLINK® 400 Additive Technology Product Description and Application Guideline" and "FILMLINK® 400 Powder". A graph giving a typical particle size distribution for FILMLINK® 400 calcium carbonate powder is given on this second page. To complete the identification, it will be noted that this sheet includes the indications "T1351" and "AOT" in its bottom right-hand corner.

For information, most of the characteristics of the coated calcium carbonate powder sold by ECC International under the name FILMLINK® 400, as featured on the technical sheet for this product available to the Applicant, are reproduced hereinbelow.

Product Description

FILMLINK® 400 Powder

Mean diameter 1.2 µm

High cutoff 8 µm

Controlled whiteness

Organophilic coating

Density −2.71 g/cm$^3$

Maximum moisture content 0.2%

Characteristics Measured on Dispatch

Hunter D-25 gloss: 95% minimum (before surface treatment)

Shade YI-1: 0.3–1.1 maximum (before surface treatment)

Residue on 325-mesh screen: 0.005% maximum

Residue on 500-mesh screen: 0.010% maximum

Moisture content: 0.20% maximum

Mean particle size: 1–1.4 µm

Coating, 0.8–1.2% by weight (stearic acid, high-grade purity, approved as food additive by the Federal Drug Administration)

Typical Chemical Analysis (% by Weight) Before Surface Treatment

Moisture content: 0.2% maximum

Calcium carbonate $CaCO_3$: 97.6%

Magnesium carbonate $MgCO_3$: 1.5%

Aluminium oxide: $Al_2O_3$: 0.18%

Iron oxide: $Fe_2O_3$: 0.08%

Silica: $SiO_2$: 0.2%

Manganese oxide: MnO: 0.004%

Heavy metals: less than 40 ppm

Typical Physical Characteristics

Mean particle size (before surface treatment): 1.2 microns

Dry gloss—Hunter D-25 (before surface treatment): 95

Apparent specific weight

Loose 720 kg/m$^3$

Compacted 100 kg/m$^3$

Rub out oil absorption 16

The compositions of the invention may be prepared by any suitable process. Good results are obtained if they are prepared using the process according to the invention.

The invention consequently also relates to a process for preparing compositions according to the invention, as defined above, according to which at least one ε-caprolactone polymer and calcium carbonate are melt-blended in an extruder.

For the purposes of the present invention, the expression "melt reaction" is intended to denote any reaction in the substantial absence of solvent and at a temperature at least equal to the melting point of the ε-caprolactone polymers.

The term "extruder" is intended to denote any continuous device comprising at least one feed zone and, at its outlet, a discharge zone preceded by a compression zone, this compression zone forcing the melt to pass through the discharge zone. The discharge zone may also be followed by a granulating device or a device that gives the extrudate a profiled shape, such as a film or a bottle blank. Advantageously, use will be made of known extruders based on the work of two screws, whether they are co-rotating or counter-rotating, or of extruders of Buss type.

When the compositions according to the invention involve ε-caprolactone polymers that are branched, the ε-caprolactone polymers may have been branched prior to the preparation of the compositions according to the invention as explained above, or they may be branched at the time of preparing the compositions according to the invention, by carrying out the melt-blending in the presence of a free-radical generator. In this case, the free-radical generator is usually used in an amount that is sufficient to obtain a non-zero degree of branching of the ε-caprolactone polymers while avoiding the formation of a gel. An example of a free-radical generator that may be used is 2,5-dimethyl-2,5-di-t-butylperoxyhexane (DHBP).

A subject of the invention is also articles obtained using the compositions according to the invention as defined above.

These articles may be obtained by using the compositions according to the invention by extrusion, by thermoforming or by injection. Preferably, the articles are obtained by using the compositions according to the invention by extrusion.

The articles according to the invention advantageously have an impact strength, determined according to ISO standard 7765-1 A (1988), that is better than that of similar articles obtained by the same processing technique using compositions of identical reference, but free of calcium carbonate.

The conditions of the processing technique for the articles according to the invention are similar and as close as possible to those used for the similar articles and are known to those skilled in the art.

It is possible to obtain by direct manufacture such a reference composition, free of calcium carbonate, corresponding to a given composition according to the invention.

It is also possible to obtain such a composition using the composition according to the invention under consideration, by dissolving the said composition, for example in chloroform, totally removing the mineral fillers present by any suitable method that does not affect the polymer, for example by filtration, and evaporating off the solvent so as to recover the solid polymer in order then to process it. The processing may take place, for example, by pressing or extrusion.

The articles according to the invention may be chosen from the following categories of articles: films, foams, bottles, plaques and sheets. Preferably, the articles according to the invention are films, which may advantageously be obtained by extrusion blow-moulding or by flat-die extrusion.

The examples that follow serve to illustrate the invention without, however, limiting its scope.

Calcium Carbonate

The calcium carbonate used in Examples 2, 3, 4, 6, 8, 9 and 10 according to the invention is FILMLINK® 400 calcium carbonate sold by ECC International.

Chemical analyses, thermogravimetric measurements, particle size measurements and a specific surface area measurement were carried out on the FILMLINK® 400 calcium carbonate before producing the compositions. These analyses and the results observed are detailed below.

Chemical Analyses of FILMLINK® 400 Calcium Carbonate

The carboxylic acids present in the FILMLINK® 400 calcium carbonate were assayed according to the method described below.

FILMLINK® 400 calcium carbonate was subjected to a hydrolysis with 12N HCl for 1 hour at reflux. The cooled aqueous phase was extracted with diethyl ether. The extract was washed with distilled water until no further acidity was observed, and then filtered over anhydrous sodium sulphate. It was then dried in a vacuum oven to constant weight.

The various components were identified by thin layer chromatography and quantified by gas chromatography.

The same techniques used without carrying out hydrolysis before the diethyl ether extraction step allowed a determination of the proportion of free fatty acids, which are not chemically bound to the calcium carbonate.

It was found from these analyses that the total organic matter content was 1% by weight, and that the composition of the organic fraction mainly comprised fatty acids.

The fraction of organic matter coating the calcium carbonate particles had a composition as given in Table 1.

TABLE 1

| Compound | Number of carbons | % by weight in the coating |
|---|---|---|
| Palmitic acid | $C_{16}$ | 47 |
| Stearic acid | $C_{18}$ | 44 |
| Myristic acid | $C_{14}$ | 1.3 |
| Heptadecanoic acid | $C_{17}$ | 0.9 |
| Pentadecanoic acid | $C_{15}$ | 0.2 |
| Eicosanoic acid | $C_{20}$ | 0.1 |
| Docosanoic acid | $C_{22}$ | 0.2 |
| Cis-oleic acid + linoleic acid | $C_{18}$, unsaturated | 0.05 |

The remainder represented a little over 6% by weight. No unidentified fraction of the extract represented more than 0.2% by weight of the organic matter. Among the impurities of the coating were fatty alcohols and aliphatic fatty esters.

Moreover, an analysis of the free fatty acids revealed the presence of 0.09 g of palmitic acid and 0.05 g of stearic acid per kg of FILMLINK® 400 product.

The total amount of fatty acids not bound to the calcium carbonate particles was thus 0.14 g/kg, i.e. 0.014% by weight of FILMLINK® 400 product.

Thermogravimetric Measurements of FILMLINK® 400 Calcium Carbonate

A thermogravimetric analysis was carried out on samples of 4 grams of ® 400 calcium carbonate, placed without packing on platinum crucibles. The analyser used was a TA1 thermobalance from Mettler, No. 32760, operating with Anatech software. The tests were carried out under a stream of dry air.

During a first test, a heating at 0.5 K/minute from 20 to 200° C. was carried out, and during a second test the heating was carried out at 1 K/minute from 20 to 400° C. The results, expressed as weight loss, are given below.

| Test | Weight loss, g/kg | | | | |
|---|---|---|---|---|---|
| | at 100° C. | at 150° C. | at 180° C. | at 200° C. | at 400° C. |
| 1 | 0.2 | 0.4 | 0.9 | 1.2 | — |
| 2 | 0.2 | 0.3 | 0.8 | 1 | 10.3 |

Particle Size Measurements on FILMLINK® 400 Calcium Carbonate

Measurements of the particle size distribution of FILMLINK® 400 calcium carbonate were carried out by light scattering with a Coulter LS 230 laser granulometer using the PIDS (Polarization Intensity Differential Scattering) measuring system. This machine measures the size distribution of particles in suspension in a carrier liquid. The particles were used as sold, i.e. in the coated state. They were pre-suspended in isopropanol and then injected into the granulometer. The measurement was carried out for 90 seconds. The values of the various parameters were supplied directly by the software adapted to the granulometer used. The measurements were performed without applying ultrasound.

A mean particle diameter of 1.5 μm was observed.

The fraction of particles with a diameter below 0.1 μm was 2.4% by volume; the fraction of particles with a diameter above 10 μm was 0.5% by volume, and the fraction of particles with a diameter of more than 25 μm was 0.003% by volume, i.e. entirely negligible.

A high cutoff of 7.4 μm was also observed.

Measurement of the Specific Surface Area of FILMLINK® 400 Calcium Carbonate

The specific surface area was measured according to the BET method. The value found was 1.4 $m^2/g$.

Manufacture of the Compositions

The extruder used was the WERNER & PFLEIDERER ZSK® 40 co-rotating twin-screw extruder. The screw diameter is 40 mm and their length is 1 360 mm. The screw spin speed is 200 rpm (rotations per minute).

The extruder was arranged such that it comprised, successively, a feed zone, a zone for melting the material, a homogenization zone, optionally a reaction zone, optionally a zone for introducing calcium carbonate and optional additives, and a discharge zone preceded by a compression zone. Each of these zones was at a specific temperature.

The zone for feeding in ε-caprolactone polymers was at a temperature of less than or equal to 20° C.

The material melting zone was at a temperature of 130° C.

The homogenization zone was at a temperature of 130° C.

The reaction zone was at a temperature of 180° C.

The zone for introducing calcium carbonate and optional additives, for example such as stabilizers, was at a temperature of 180° C.

The compression zone was at a temperature of 180° C.

The discharge zone was at a temperature of 180° C.

The extruder was equipped with a rod die. The product was cooled in a bath of water and then granulated and dried.

Manufacture of Films by Extrusion Blow-Moulding

Films were produced by extrusion blow-moulding using the compositions obtained according to Examples 1 to 6 on the WERNER & PFLEIDERER ZSK® 40 extruder, by means of a second extruder.

An extruder of the type such as Dolci 20 was used. This single-screw extruder was used to bring the material to the molten state (75–150° C.) before forcing it through an annular die 30 mm in diameter and with a gap of 0.75 mm (28.5 mm core), oriented perpendicularly relative to the axis of the extruder, such that the product leaves vertically upwards.

A Battenfeld 45 extruder, with an annular die 80 mm in diameter and with a gap of 0.9 mm, was also used.

The material flow rate was adjusted by changing the rotation speed of the screw. The tubular blank was then expanded by a pressure of internal air and cooled externally by a flow of air at ambient temperature distributed uniformly around the bubble thus formed a few centimetres above the die. The degree of expansion (defined as being equal to the ratio of the diameter of the bubble to the diameter of the die) was controlled by adjusting the internal air pressure. The bubble was then gradually flattened by 2 guides, and then pinched between 2 rolls, of which at least one is rubberized and at least one is driven. The tubular blank was also stretched axially by the two pinching rolls. The degree of stretching (defined as being equal to the ratio of the rolling speed of the film to the speed of the film at the die) was adjusted by varying the speed of the pinching rolls. The final thickness of the film depends on the die gap, the degree of expansion and the degree of stretching.

Manufacture of Films by Flat-Die Extrusion

Films were produced by flat-die extrusion using the compositions obtained according to Examples 7 to 10 on the WERNER & PFLEIDERER ZSK® 40 extruder, by means of a second extruder.

An extruder of the type such as Troester UP 30 was used. This single-screw extruder was used to bring the material to the molten state (70–140° C.) before forcing it through a 300 mm flat die of Johnson 300/2 type. The film of polymer melt was then collected on a drum (chill-roll) of Reifenhauser type, at 15° C. The thickness of the film depends on the material flow rate and on the line speed.

Characterization of the Films Obtained

Impact strength measurements were carried out on the films obtained.

The impact strength was measured according to ISO standard 7765-1 (1988) (method A).

EXAMPLE 1 (COMPARATIVE)

A mixture of 60% by weight of poly-ε-caprolactone CAPA® 650 sold by Solvay and 40% by weight of poly-ε-caprolactone CAPA® 680 sold by Solvay (the number-average molecular mass of which, measured by gel permeation chromatography, is 55 000 g/mol) was introduced into the feed zone of a WERNER & PFLEIDERER ZSK® 40 extruder at a flow rate of 30 kg/h and travelled through the various zones of the extruder.

In the melt zone of the extruder, 2,5-dimethyl-2,5-di-t-butylperoxyhexane (DHBP) sold under the brand name LUPERSOL® 101 by Peroxid Chemie, as a mixture with carbon dioxide, was sprayed onto the poly-ε-caprolactone using a suitable introduction device. The DHBP was introduced at a rate of 1 g per kg of poly-ε-caprolactone mixture.

A film (No. 1) containing no filler was produced by extrusion blow-moulding on a Dolci 20 extruder using the composition according to Example 1 in the manner described above and with the conditions given below.

| Film No. | Flow rate kg/h | Speed m/min | Thickness μm | Degree of stretching | Degree of expansion |
|---|---|---|---|---|---|
| 1 | 2.1 | 1.3 | 58 | 2.6 | 4.2 |

Film No. 1 has a smooth appearance and is characterized by an impact strength, measured according to ISO standard 7765-1 (method A), of 63 g for a thickness of 58 μm.

EXAMPLE 2 (ACCORDING TO THE INVENTION)

Example 1 was repeated, but with the addition of 30% by weight, relative to the final composition, of a coated calcium carbonate powder sold under the name FILMLINK® 400 by ECC International into the calcium carbonate introduction zone of the WERNER & PFLEIDERER ZSK® 40 extruder described above.

A film (No. 2) was produced using the composition according to Example 2 in the same manner as in Example 1 and with the conditions given below.

| Film No. | Flow rate kg/h | Speed m/min | Thickness μm | Degree of stretching | Degree of expansion |
|---|---|---|---|---|---|
| 2 | 3.25 | 1.6 | 56 | 2.4 | 4.5 |

Film No. 2 is characterized by an impact strength, measured according to ISO standard 7765-1 (method A), of 74 g for a film thickness of 56 μm, i.e., surprisingly, an impact strength that is better than that of Example 1, which showed a lower impact strength for a greater thickness.

The film is as smooth in appearance as the film obtained according to Example 1.

EXAMPLE 3 (ACCORDING TO THE INVENTION)

Example 1 was repeated, adding 40% by weight, relative to the final composition, of coated calcium carbonate sold under the name FILMLINK ® 400 by ECC International into the calcium carbonate introduction zone of the WERNER & PFLEIDERER ZSK® 40 extruder described above.

A film (No. 3) was produced using the composition according to Example 3 in the same manner as that of Example 1 and with the conditions given below.

| Film No. | Flow rate kg/h | Speed m/min | Thickness μm | Degree of stretching | Degree of expansion |
|---|---|---|---|---|---|
| 3 | 3.5 | 2.8 | 28 | 4.5 | 4.5 |

Film No. 3 is characterized by an impact strength, measured according to ISO standard 7765-1 (method A), of 278 g for a film only 28 μm thick. Thus, extremely surprisingly, an impact strength that was very much greater than that of Example 1 was obtained, for a film that was nonetheless twice as thin. The film still maintains a smooth appearance.

EXAMPLE 4 (ACCORDING TO THE INVENTION)

Example 1 was repeated, adding 50%o by weight, relative to the final composition, of coated calcium carbonate sold under the name FILMLINK® 400 by ECC International into the calcium carbonate introduction zone of the WERNER & PFLEIDERER ZSK® 40 extruder described above.

A film (No. 4) was produced using the composition according to Example 4 in the same way as that of Example 1 and with the conditions given below.

| Film No. | Flow rate kg/h | Speed m/min | Thickness μm | Degree of stretching | Degree of expansion |
|---|---|---|---|---|---|
| 4 | 3.4 | 1.75 | 39 | 3.2 | 4.6 |

Film No. 4 is characterized by an impact strength, measured according to ISO standard 7765-1 (method A), of 110 g.

Even at this very high filler concentration, the film maintains a smooth appearance, with no hard points, which is an exceptional result.

EXAMPLE 5 (COMPARATIVE)

A composition according to Example 1 was used to manufacture a film (No. 5) by extrusion blow-moulding on a Battenfeld 45 extruder as described above, with the conditions given below.

| Film No. | Flow rate kg/h | Speed m/min | Thickness μm | Degree of stretching | Degree of expansion |
|---|---|---|---|---|---|
| 5 | 20 | 8 | 28 | 5.4 | 4 |

Film No. 5 is characterized by an impact strength of less than 40 g. In point of fact, it breaks with each impact of the projectile of lightest mass available, equal to 40 g.

EXAMPLE 6 (ACCORDING TO THE INVENTION)

A composition according to Example 2, containing 30% by weight, relative to the final composition, of a coated calcium carbonate powder sold under the name FILMLINK® 400 by ECC International, was used for the manufacture of a film by extrusion blow-moulding on a Battenfeld 45 extruder as described above.

A film (No. 6) was produced using this composition, with the conditions given below.

| Film No. | Flow rate kg/h | Speed m/min | Thickness μm | Degree of stretching | Degree of expansion |
|---|---|---|---|---|---|
| 6 | 18.4 | 6 | 34 | 5.5 | 4 |

Film No. 6 is characterized by an impact strength, measured according to ISO standard 7765.1, of 167 g, i.e. a value very much higher than that obtained with the film produced in Example 5, which has a similar thickness. It has a smooth appearance.

During impact strength tests performed on the films obtained according to the invention, it is found that these films do not undergo brittle fracture before failing. The impact of the projectile is dampened and makes little noise. Furthermore, the films according to the invention whiten around the impact zone, which is an indication of an appreciable elongation before the failure, where appropriate.

EXAMPLE 7 (COMPARATIVE)

A mixture of 50% by weight of poly-ε-caprolactone CAPA® 650 sold by Solvay and 50% by weight of poly-ε-caprolactone CAPA® 680 sold by Solvay was introduced into the feed zone of a WERNER & PFLEIDERER ZSK® 40 extruder at a flow rate of 30 kg/h and travels through the various zones of the extruder.

A film (No. 7) containing no filler was produced by flat-die extrusion on a Troester UP 30 extruder using the composition according to Example 7 in the manner described above and with the conditions given below.

| Film No. | Flow rate, kg/h | Speed, m/min | Thickness, µm |
|---|---|---|---|
| 7 | 4.1 | 4 | 77 |

Film No. 7 has a smooth appearance and is characterized by an impact strength, measured according to ISO standard 7765-1 (method A), of 125 g for a thickness of 77 µm.

EXAMPLE 8 (ACCORDING TO THE INVENTION)

Example 7 was repeated, but adding 30% by weight, relative to the final composition, of a coated calcium carbonate powder sold under the name FILMLINK® 400 by ECC International into the calcium carbonate introduction zone of the WERNER & PFLEIDERER ZSK® 40 extruder described above.

A film (No. 8) was produced using the composition according to Example 8 in the same manner as in Example 7 and with the conditions given below.

| Film No. | Flow rate, kg/h | Speed, m/min | Thickness, µm |
|---|---|---|---|
| 8 | 6 | 4 | 97 |

Film No. 8 is characterized by an impact strength, measured according to ISO standard 7765-1 (method A), of 717 g for a film 97 µm thick, i.e. an impact strength that is markedly better than that of Example 7.

The film is as smooth in appearance as the film obtained according to Example 7.

EXAMPLE 9 (ACCORDING TO THE INVENTION)

Example 7 was repeated, adding 40% by weight, relative to the final composition, of coated calcium carbonate sold under the name FILMLINK® 400 by ECC International into the calcium carbonate introduction zone of the WERNER & PFLEIDERER ZSK® 40 extruder described above.

A film (No. 9) was produced using the composition according to Example 9 in the same manner as in Example 7 and with the conditions given below.

| Film No. | Flow rate, kg/h | Speed, m/min | Thickness, µm |
|---|---|---|---|
| 9 | 6.1 | 4 | 84 |

Film No. 9 is characterized by an impact strength, measured according to ISO standard 7765-1 (method A), of more than 1 140 g for a film 84 µm thick. Thus, extremely surprisingly, an impact strength by far superior to that of Example 7 was obtained. The film still maintains a smooth appearance.

EXAMPLE 10 (ACCORDING TO THE INVENTION)

Example 7 was repeated, adding 50% by weight, relative to the final composition, of coated calcium carbonate sold under the name FILMLINK® 400 by ECC International into the calcium carbonate introduction zone of the WERNER & PFLEIDERER ZSK® 40 extruder described above.

A film (No. 10) was produced using the composition according to Example 10 in the same manner as in Example 7 and with the conditions given below.

| Film No. | Flow rate, kg/h | Speed, m/min | Thickness, µm |
|---|---|---|---|
| 10 | 7 | 4 | 87 |

Film No. 10 is characterized by an impact strength, measured according to ISO standard 7765-1 (method A), of 591 g.

Even at this very high filler concentration, the film retains a smooth appearance, with no hard points, which is an exceptional result.

What is claimed is:

1. A composition comprising:
   at least one ε-caprolactone polymer and
   calcium carbonate in the form of coated particles,
   wherein the coating represents less than 3% by weight of the calcium carbonate particles.
2. The composition of claim 1, which comprises only ε-caprolactone homopolymers and does not comprise copolymers of ε-caprolactone with other monomers.
3. The composition of claim 1, which comprises at least one ε-caprolactone unbranched homopolymers.
4. The composition of claim 1, which comprises at least one ε-caprolactone branched homopolymers.
5. The composition of claim 1, which comprises at least one copolymers of ε-caprolactone with another monomers.
6. The composition of claim 1, which comprises at least 25% by weight of calcium carbonate.
7. The composition of claim 1, which comprises 30 to 50% by weight calcium carbonate.
8. The composition of claim 1, wherein said calcium carbonate particles have a mean diameter of less than 5 µm.
9. The composition of claim 1, wherein said calcium carbonate particles have a mean diameter of less than 3 µm.
10. The composition of claim 1, wherein said calcium carbonate particles have a mean diameter of less than 1 µm.
11. The composition of claim 1, wherein the fraction of the calcium carbonate particles with a diameter of greater than 10 µm is less than 3% by volume.

12. The composition of claim 1, wherein the calcium carbonate particles have a high cutoff of less than 12 μm.

13. The composition of claim 1, wherein the calcium carbonate is of natural origin and is obtained from ground marble.

14. The composition of claim 1, wherein the calcium carbonate contains less than 0.5% moisture.

15. The composition of claim 1, wherein the coating comprises one or more saturated fatty acids with a chain of 8 to 26 carbon atoms.

16. The composition of claim 1, wherein the coating comprises one or more unsaturated fatty acids with a chain of 8 to 26 carbon atoms.

17. The composition of claim 1, wherein said calcium carbonate particles comprise fatty acids bound to the calcium carbonate particles and fatty acids not bound to the calcium carbonate particles.

18. The composition of claim 17, wherein the proportion of fatty acids not bound to the calcium carbonate particles is less than 0.5% by weight relative to the weight of calcium carbonate.

19. A process for preparing the composition of claim 1, wherein at least one E-caprolactone polymer and calcium carbonate are melt-blended in an extruder.

20. An article comprising the composition of claim 1.

21. An article obtained by extruding the composition of claim 1.

22. The article of claim 20 which is selected from the group consisting of a foam, bottle, plaque and sheet.

23. The article of claim 20 which is film.

24. The film of claim 23 which is obtained by extrusion blow-molding or by flat-die extrusion.

25. The article of claim 20, which has an impact strength, determined according to ISO standard 7765-1 A (1988), which is better than that of a similar article obtained by the same processing technique using a composition of identical reference, but free of calcium carbonate.

* * * * *